(12) United States Patent  
Simmons et al.

(10) Patent No.: US 7,095,608 B2  
(45) Date of Patent: Aug. 22, 2006

(54) VIDEO DISPLAY MOUNTING SYSTEM AND METHOD

(75) Inventors: Louis P. Simmons, Jones, MI (US); James L. Hamilton, Niles, MI (US); Gerald J. Maffetone, Granger, IN (US)

(73) Assignee: Audiovox Corporation, Hauppauge, NY (US)

( * ) Notice: Subject to any disclaimer, the term of this patent is extended or adjusted under 35 U.S.C. 154(b) by 112 days.

(21) Appl. No.: 10/916,748

(22) Filed: Aug. 12, 2004

(65) Prior Publication Data

US 2006/0034040 A1  Feb. 16, 2006

(51) Int. Cl.  
*G06F 1/16*  (2006.01)

(52) U.S. Cl. ...................... 361/681; 361/679

(58) Field of Classification Search ............... 361/679, 361/681  
See application file for complete search history.

(56) References Cited

U.S. PATENT DOCUMENTS

| | | | | |
|---|---|---|---|---|
| 5,611,513 A | * | 3/1997 | Rosen | 248/222.11 |
| 5,644,471 A | * | 7/1997 | Schultz et al. | 361/686 |
| 5,822,023 A | * | 10/1998 | Suman et al. | 348/837 |
| 5,917,435 A | * | 6/1999 | Kamiya et al. | 340/995.26 |
| 6,758,521 B1 | * | 7/2004 | Imamura et al. | 297/217.3 |
| 6,926,329 B1 | * | 8/2005 | Neumann et al. | 296/24.34 |
| 2004/0227861 A1 | * | 11/2004 | Schedivy | 348/837 |
| 2005/0146844 A1 | * | 7/2005 | Hussaini et al. | 361/681 |

* cited by examiner

*Primary Examiner*—Yean-Hsi Chang  
(74) *Attorney, Agent, or Firm*—F. Chau & Associates LLC

(57) ABSTRACT

A display panel mounting system comprises a mounting base having at least one pin, and a mating mechanism coupled to a display panel for coupling to the mounting base. The mating mechanism comprises a first plate fixed to the display panel comprising a pair of prongs having an opening for receiving the pin of the mounting base, and a second plate movable coupled to the first plate, comprising a latch for securing the pin between the pair of prongs of the first plate.

13 Claims, 8 Drawing Sheets

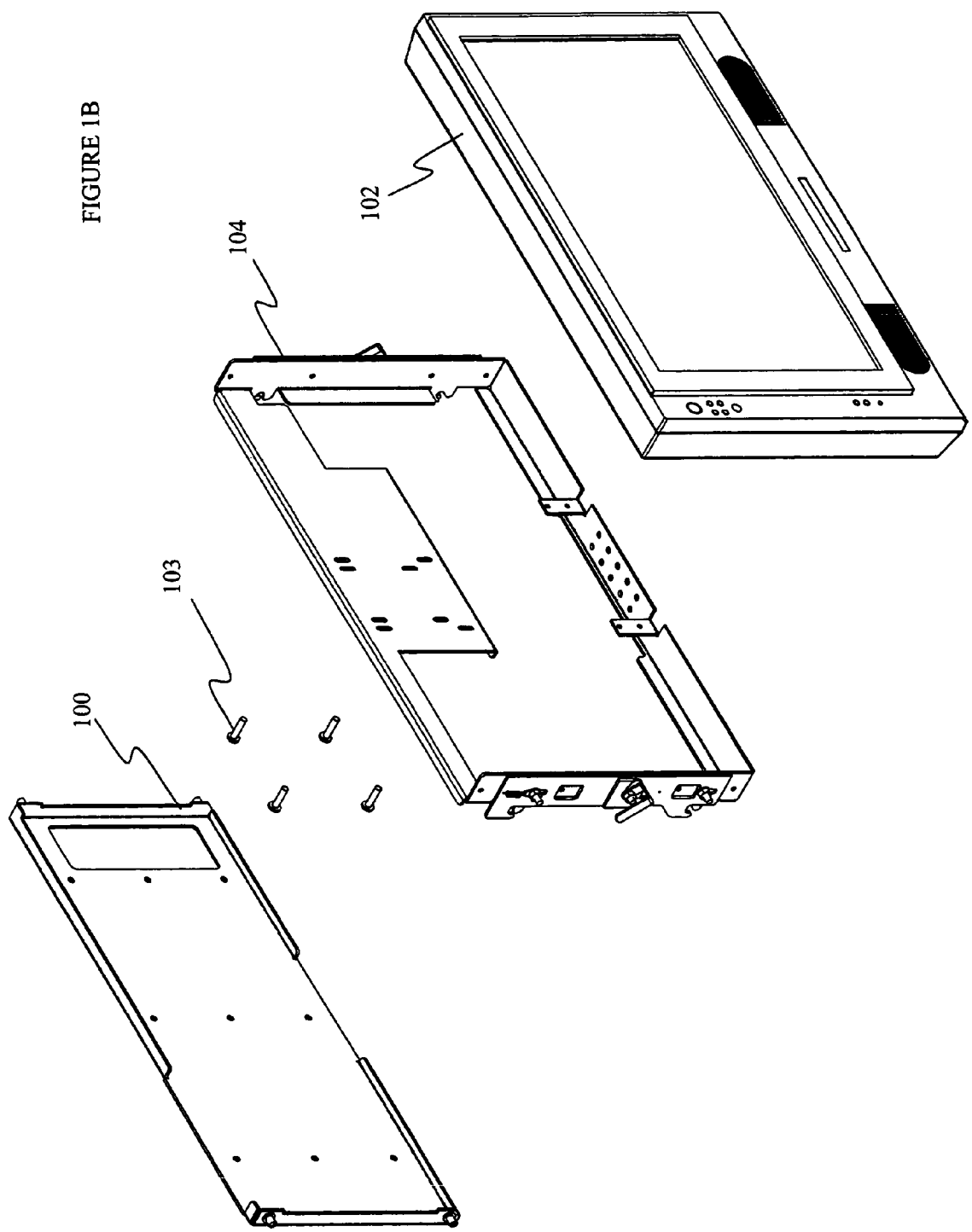

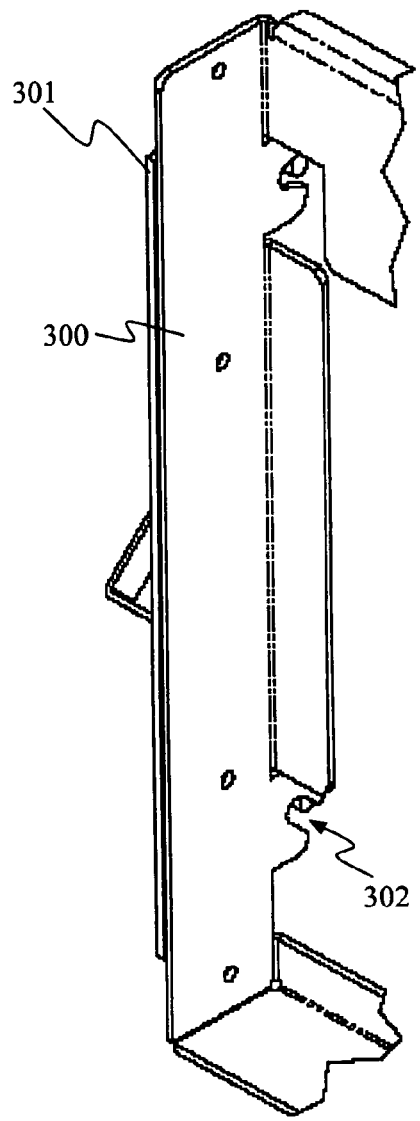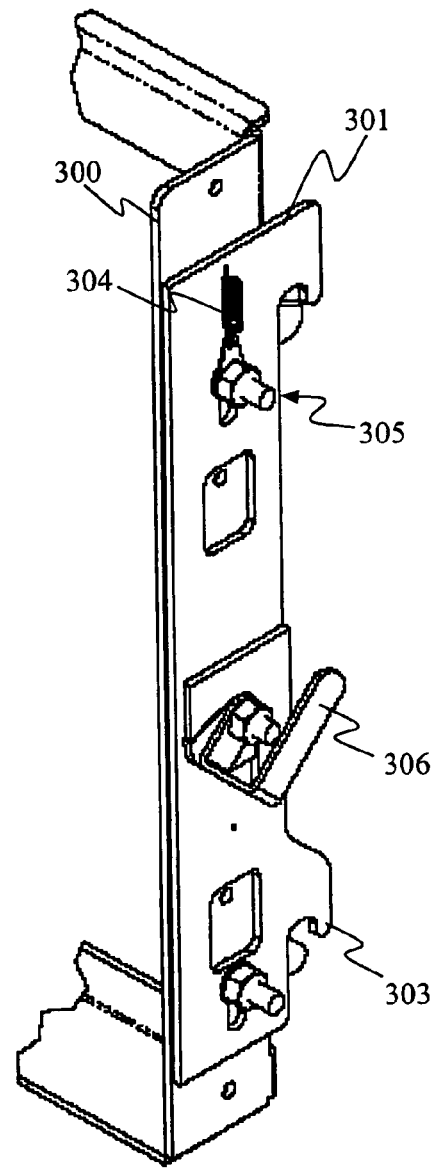
FIGURE 3C
FIGURE 3D

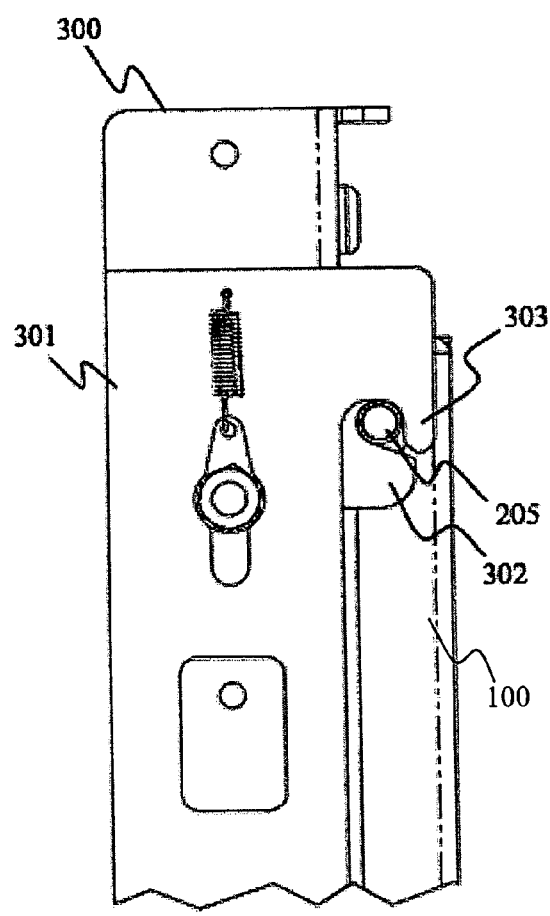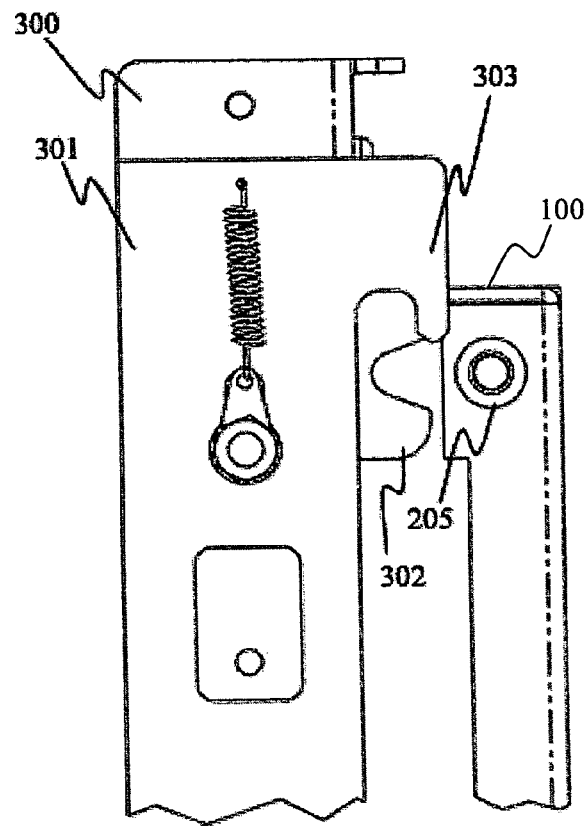
FIGURE 3E                    FIGURE 3F

VIDEO DISPLAY MOUNTING SYSTEM AND METHOD

BACKGROUND OF THE INVENTION

1. Field of the Invention

The present invention relates to video display installations, and more particularly to a mounting system for mounting/un-mounting a video display to a substrate.

2. Discussion of Related Art

Video systems in automotive applications provide travelers with entertainment. The video systems typically include a liquid crystal display and a media player such as a digital video disk player. The small size and high value of this equipment presents a tempting target for thieves. Automotive dealerships have become targets of these thieves due to the high concentration of valuable equipment, including Xenon headlamps, and stereo and video systems, and the typically lax security associated with dealer lots.

Therefore, a need exists for a system for mounting/un-mounting a video display from a vehicle, wherein the video display may be secured away from the vehicle.

SUMMARY OF THE INVENTION

A method for installing a display panel in a vehicle comprises installing a mounting base in the vehicle, preparing the display panel with a mating mechanism, shipping the vehicle and the display panel to a retail seller, and receiving, by the retail seller, the vehicle and the display panel. The method comprises coupling the display panel to the vehicle via the mating mechanism and the mounting base after receipt of the vehicle and display panel by the retail seller.

The vehicle and the display panel are delivered to the retail seller from respective manufacturers of the vehicle and the display panel.

The method comprises delaying the coupling of the display panel to the vehicle via the mating mechanism and the mounting base until a time after the vehicle and display panel are contracted for sale to a consumer.

The method comprises removing an installed display panel from the vehicle at a time after the receipt of the vehicle, wherein the display panel is delivered to the retailer seller installed in the vehicle, wherein the coupling of the display panel to the vehicle via the mating mechanism and the mounting base is performed at a time after the vehicle and display panel are contracted for sale to a consumer.

A display panel mounting system comprises a mounting base, having at least one pin, coupled to a vehicle, and a mating mechanism coupled to a display panel for coupling to the mounting base. The mating mechanism comprises a first plate fixed to the display panel comprising a pair of prongs having an opening for receiving the pin of the mounting base, and a second plate movable coupled to the first plate, comprising a latch for securing the pin between the pair of prongs of the first plate.

The display panel mounting system further comprises a spring mechanism maintaining a closed position of the latch with respect to the prong, wherein the second plate may be moved against the first plate, moving the latch away from the opening of the pair of prongs, enabling the pair of prongs to receive or release the pin, against a force of the spring mechanism.

The display panel comprises at least two edges having respective mating mechanism. The mating mechanism comprises a plurality of pairs of prongs for receiving respective pins of the mounting base and latches for securing the pins between the respective pairs of prongs. The mating mechanism is integrated into a tray coupled to the display panel.

The mounting base comprises a tray having a generally rectangular shape, and a plurality of sidewalls forming a top wall, a bottom wall, a left wall and a right wall defining an enclosure having an open front, wherein at least one of the sidewalls comprising the pin, wherein the pin extends outward and perpendicular to the sidewall. The pin may extend inward and perpendicular to the sidewall.

According to an embodiment of the present disclosure, a display panel mounting system includes a mounting base, having at least one pin, coupled to a display panel and a mating mechanism coupled to a vehicle for coupling to the mounting base. The mating mechanism comprises, a first plate fixed to the vehicle comprising a pair of prongs having an opening for receiving the pin of the mounting base, and a second plate movable coupled to the first plate, comprising a latch for securing the pin between the pair of prongs of the first plate.

BRIEF DESCRIPTION OF THE DRAWINGS

Preferred embodiments of the present invention will be described below in more detail, with reference to the accompanying drawings:

FIG. 1B is an illustration of a mounting system according to an embodiment of the present disclosure;

FIGS. 3C and 3D are illustrations of mounting mechanisms according to an embodiment of the present disclosure;

FIGS. 3E and 3F are illustrations of mounting mechanisms according to an embodiment of the present disclosure;

DETAILED DESCRIPTION OF PREFERRED EMBODIMENTS

Figure 1A:
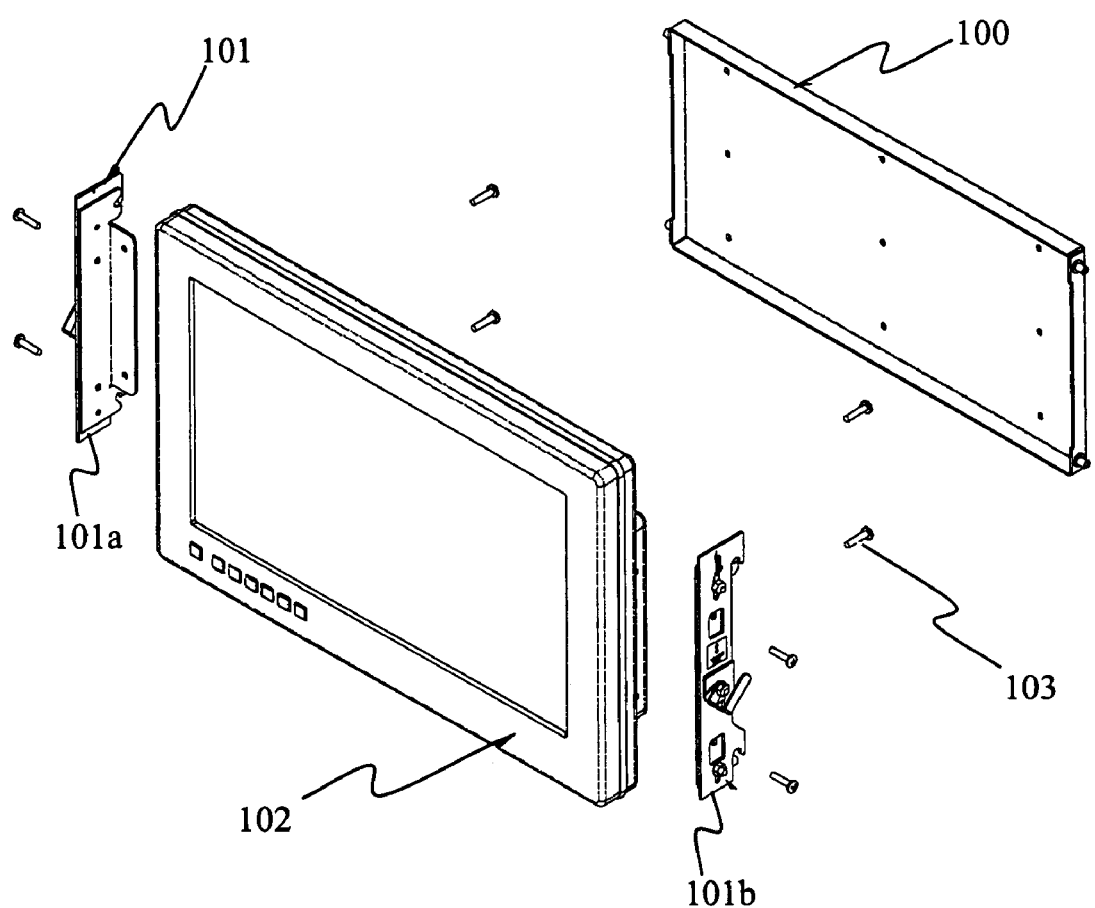
FIG. 1A is an illustration of a mounting system according to an embodiment of the present disclosure.

Referring now to FIGS. 1A and 1B, a mounting system includes a mounting base 100 and a mating mechanism, e.g., 101 or 104. The mounting base is coupled to a vehicle, e.g., a car, a sports utility vehicle (SUV), a recreational vehicle (RV), a boat, etc. The mating mechanism 101 is coupled to a video display 102, or may be incorporated into the design of the video display 102. The mounting base 100 and mating mechanism 101 engage one-another to secure the video display 102 to the vehicle. The mating mechanism 101/104 may be secured to the video display 102 by, for example, screws 103. The mating mechanism 101/104 may include multiple mating units 101a and 101b, as depicted in FIG. 1A, or may be integrated into a mating tray 104 as depicted in FIG. 1B. Further, the mounting base 100 may be coupled to the display while the mating mechanism 101/104 is coupled to the vehicle.

Figure 2A:
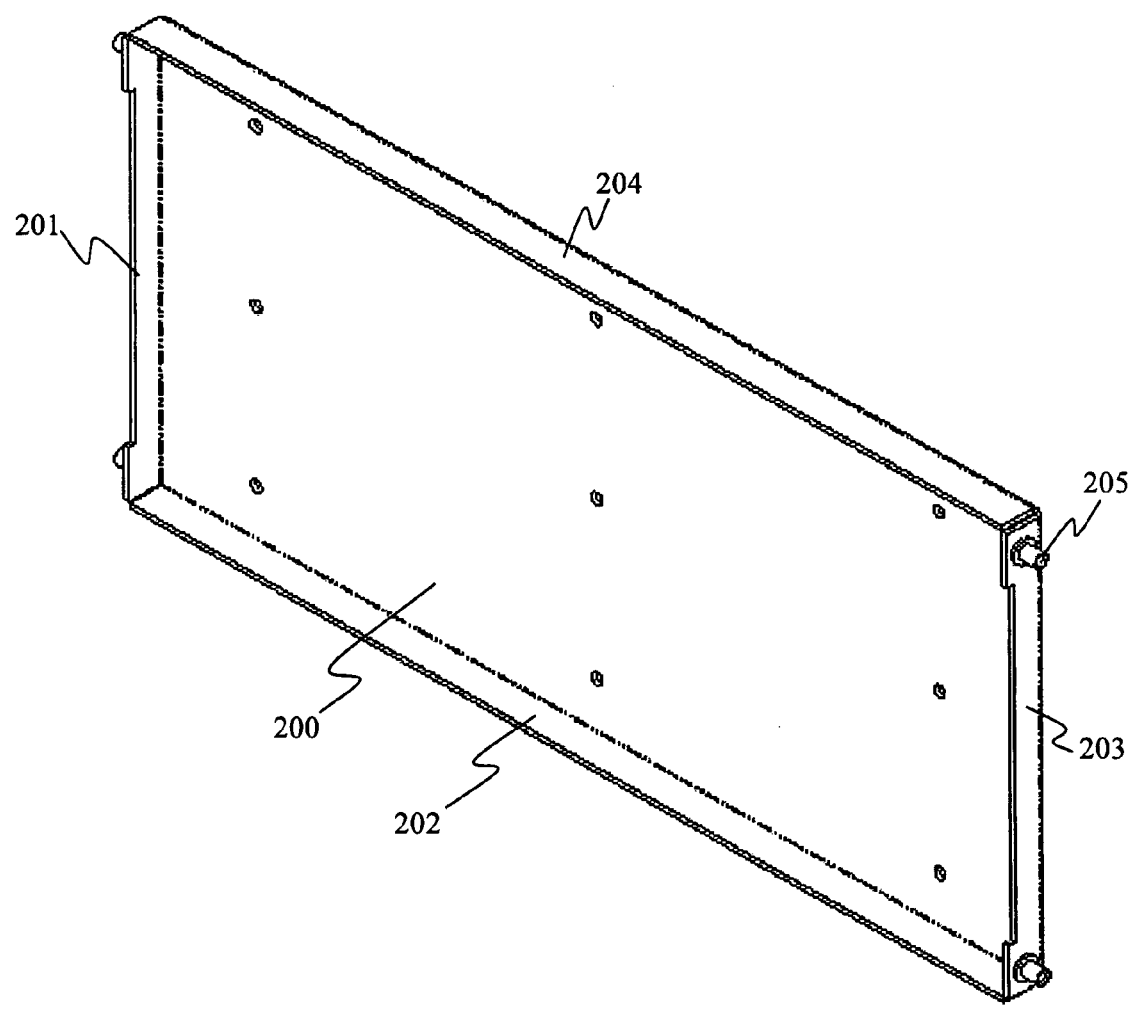
FIGS. 2A and 2B are illustrations of a mounting base according to an embodiment of the present disclosure.
Figure 2B:
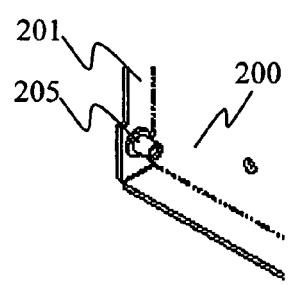

Referring to FIG. 2A, the mounting base 100 is formed as a tray 200 including sidewalls 201–204. The mounting base 100 may be formed of a metal such as Aluminum, a plastic or another rigid material. At least one of the sidewalls includes one or more pins 205. The pins 205 project outward, perpendicular to the sidewall. The pins 205 may be disposed to project inwards, perpendicular to the sidewall as shown in FIG. 2B. The mounting base 100 is secured to the vehicle using, for example, screws or clips. The mounting base 100 may be secured to, for example, a vehicle ceiling, a kitchen wall, or a vehicle seatback or headrest.

Figure 3A:
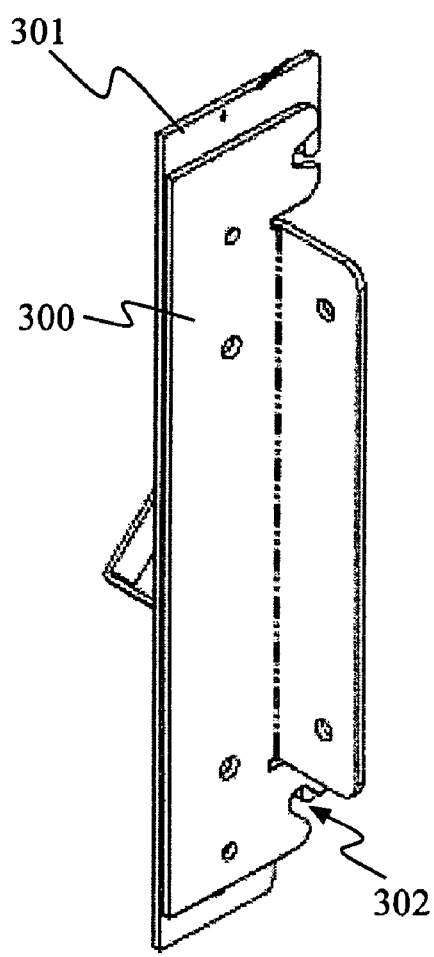
FIGS. 3A and 3B are illustrations of mounting mechanisms according to an embodiment of the present disclosure.
Figure 3B:
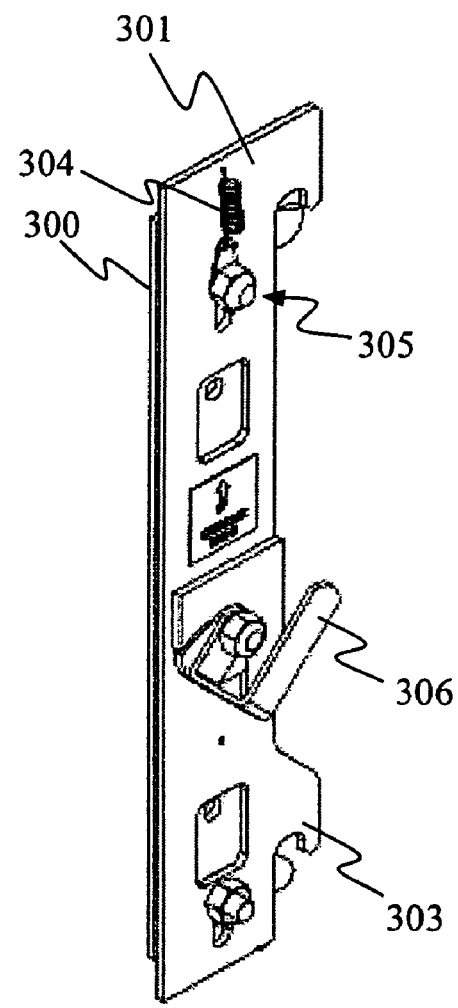
Figure 4:
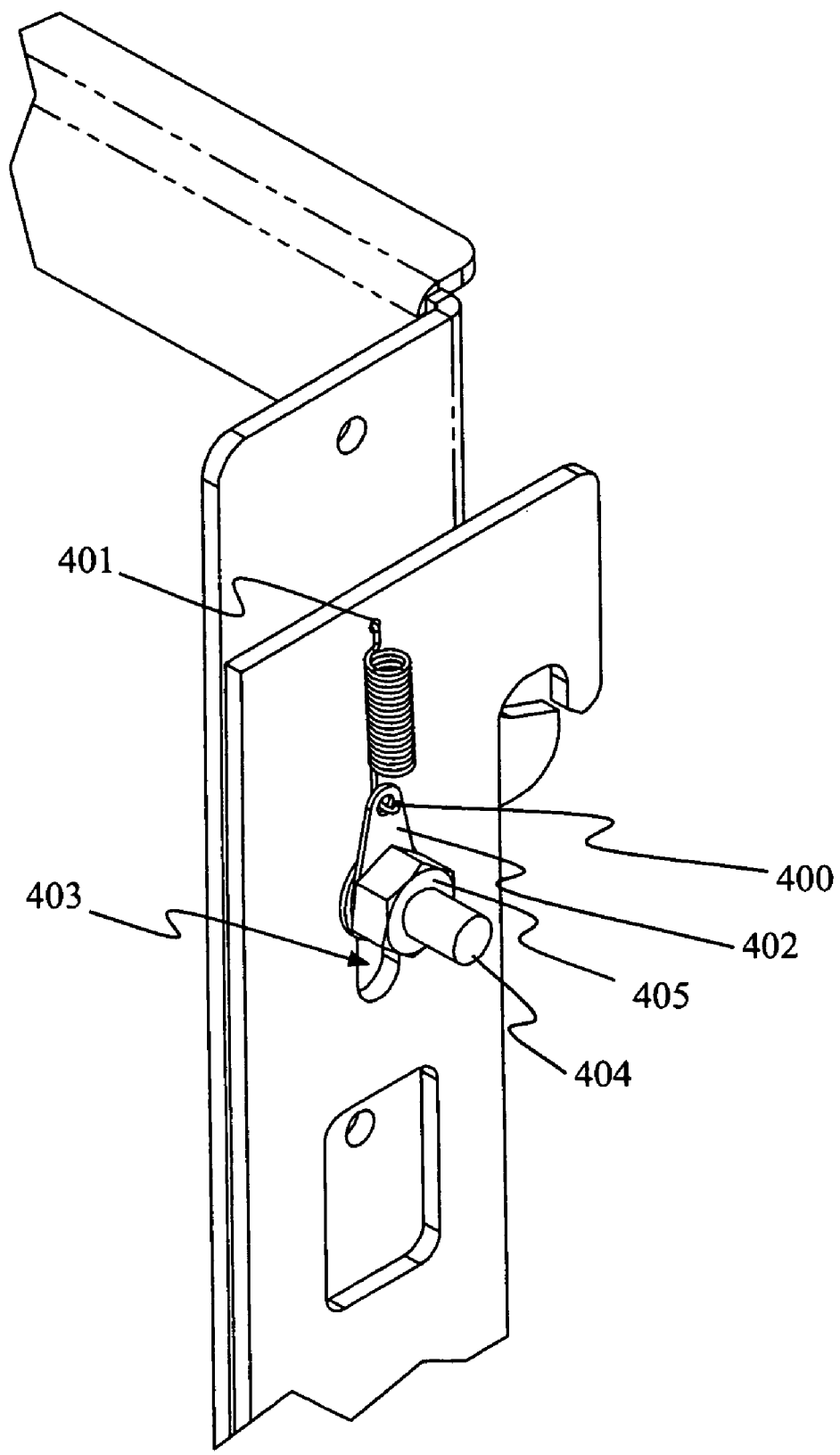
FIG. 4 is an illustration of a mounting mechanism according to an embodiment of the present disclosure.

FIGS. 3A and 3B illustrate a mating mechanism 101 according to FIG. 1A. FIGS. 3B and 3C illustrate a mating mechanism 104 according to FIG. 1B. The mating mechanism 101/104 includes a first plate 300 and a movably coupled second plate 301. The first plate 300 includes a pair of prongs 302 for receiving a pin 205 of a mounting base 100 (see also FIGS. 3E and 3F). The second plate 301 includes a latch 303 for securing the pin 205 in the pair of prongs 302. A spring mechanism 304 maintains a closed position of the latch 303 with respect to the pair of prongs 302 (see FIG. 4). A first end 400 of the spring 304 is coupled to a mounting arm 402. The mounting arm 402 is secured to a pin 404, such as a screw, extending through an oversized opening 403 of the second plate 301. A second end 401 of the spring 304 is coupled to the second plate 301, for example, by a hook on the second end 401 of the spring 304 extending into a hole in the second plate 301. A similar coupling mechanism may be used to couple the first end 400 of the spring 304 to the mounting arm 402.

The first plate 300 and the second plate 301 are coupled by hardware 305, for example, a rivet or screw 404 fixed to the first plate 300 and passing through the oversized opening 403 in the second plate 301, wherein the rivet or screw is moveable within an area defined by the oversized opening 403. A nut or other locking mechanism 405 may be used to prevent the first plate 300 and the second plate 301 from separately while allowing the plates 300–301 to move against one-another (see FIG. 4). FIG. 3E shows a closed position, wherein a pin 205 is engaged by the prong 302 and secured by the latch 303. FIG. 3F shows an open position allowing the pin 205 to freely engage/disengage the prong 302. The second plate 301 may include a handle 306 for manipulating the mating mechanism.

The video display may include a mechanism for communicating with a media player or other content provider/receiver, such as stereo equipment. The video display may include other hardware, including, for example, a CD-ROM player or DVD player.

Figure 5A:
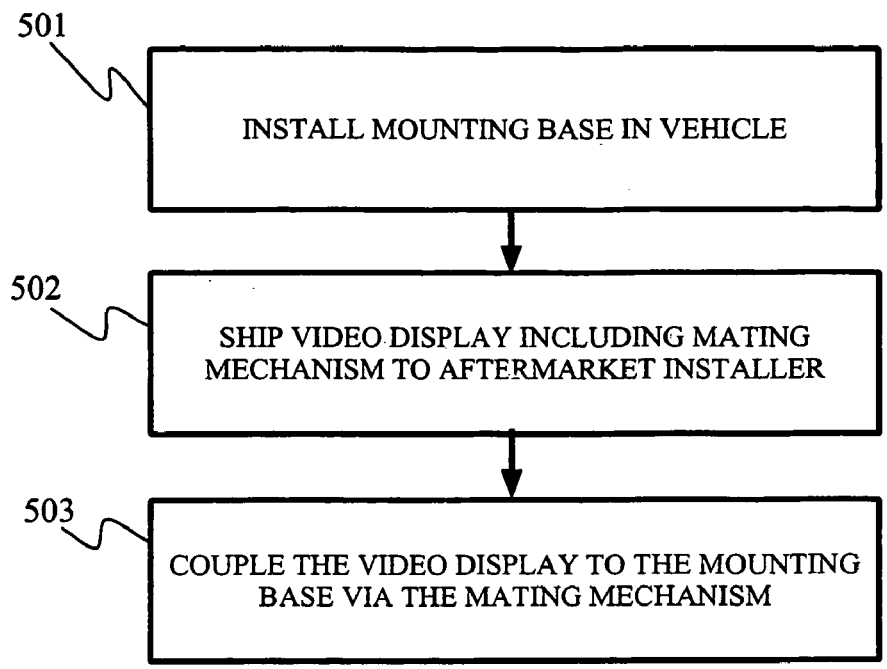
FIGS. 5A and 5B are flow charts of methods for installing a video display according to an embodiment of the present disclosure.
Figure 5B:
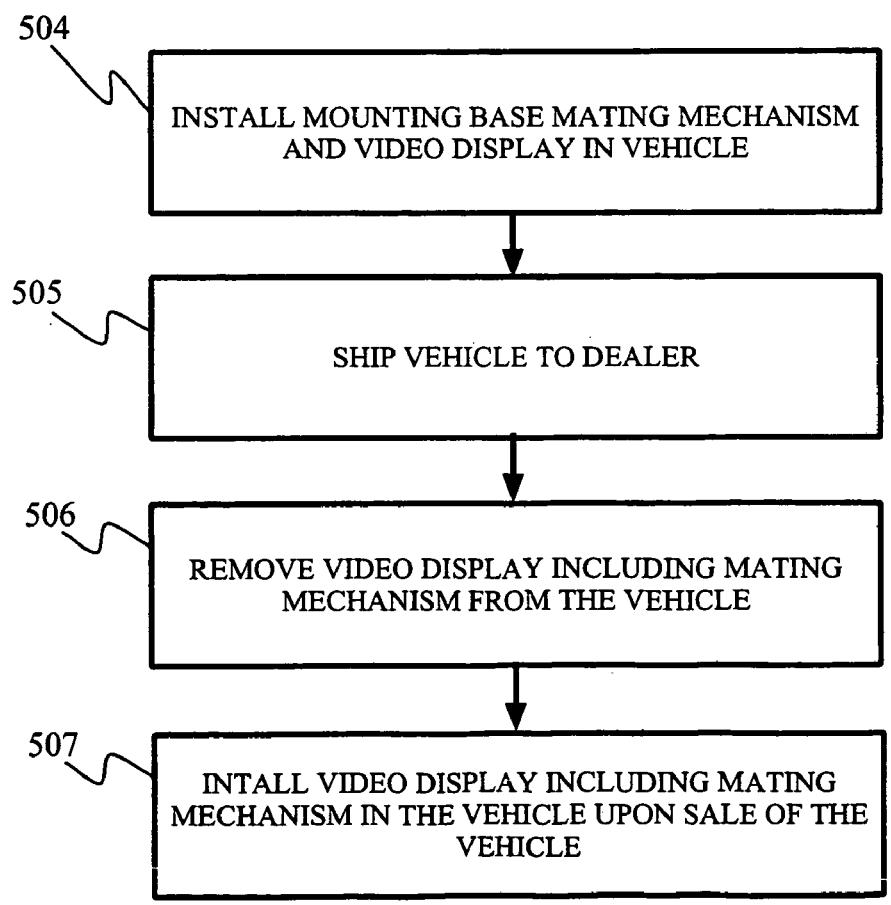

Referring to FIGS. 5A and 5B, a release mechanism for a video display may be used to remove the video display from certain situations were a risk such as damage or theft may be increased. As shown in FIG. 5A, a mounting base may be installed in a vehicle as part of the vehicle assembly process 501, while the video display and mating mechanism are shipped to vehicle dealerships 503. The video displays may be installed by the dealership at a time after the vehicle arrives at the dealership 503, for example, upon receipt of the vehicle or upon delivery of the vehicle to a consumer. As shown in FIG. 5B, the mounting base and video display having the mating mechanism may be installed during assembly of the vehicle or by an aftermarket installer 504. The vehicle and complete video system is delivered to a dealership 505, whereupon the dealer may choose to remove the video display and mating mechanism 506 until a sale of the vehicle to a consumer 507. Accordingly, the video display may be protected from damage or theft. It should be noted that a consumer may remove the video display.

Having described embodiments for a video display mounting system, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A display panel mounting system comprising:
   a mounting base, having at least one pin, coupled to a vehicle; and
   a mating mechanism coupled to a display panel for coupling to the mounting base, wherein the mating mechanism comprises,
   a first plate fixed to the display panel comprising a pair of prongs having an opening for receiving the pin of the mounting base, and
   a second plate movable coupled to the first plate, comprising a latch for securing the pin between the pair of prongs of the first plate.

2. The display panel mounting system of claim 1, further comprising a spring mechanism maintaining a closed position of the latch with respect to the prong, wherein the second plate may be moved against the first plate, moving the latch away from the opening of the pair of prongs, enabling the pair of prongs to receive or release the pin, against a force of the spring mechanism.

3. The display panel mounting system of claim 1, wherein the display panel comprises at least two edges having respective mating mechanism.

4. The display panel mounting system of claim 1, wherein the mating mechanism comprises a plurality of pairs of prongs for receiving respective pins of the mounting base and latches for securing the pins between the respective pairs of prongs.

5. The display panel mounting system of claim 1, wherein the mating mechanism is integrated into a tray coupled to the display panel.

6. The display panel mounting system of claim 1, wherein the mounting base comprises:
   a tray having a generally rectangular shape; and
   a plurality of sidewalls forming a top wall, a bottom wall, a left wall and a right wall defining an enclosure having an open front, wherein at least one of the sidewalls comprising the pin, wherein the pin extends outward and perpendicular to the sidewall.

7. The display panel mounting system of claim 1, wherein the mounting base comprises:
   a tray having a generally rectangular shape; and
   a plurality of sidewalls forming a top wall, a bottom wall, a left wall and a right wall defining an enclosure having an open front, wherein at least one of the sidewalls comprising the pin, wherein the pin extends inward and perpendicular to the sidewall.

8. A display panel mounting system comprising:
   a mounting base, having at least one pin, coupled to a display panel; and
   a mating mechanism coupled to a vehicle for coupling to the mounting base, wherein the mating mechanism comprises,
   a first plate fixed to the vehicle comprising a pair of prongs having an opening for receiving the pin of the mounting base, and
   a second plate movable coupled to the first plate, comprising a latch for securing the pin between the pair of prongs of the first plate.

9. The display panel mounting system of claim 8, further comprising a spring mechanism maintaining a closed position of the latch with respect to the prong, wherein the second plate may be moved against the first plate, moving the latch away from the opening of the pair of prongs, enabling the pair of prongs to receive or release the pin, against a force of the spring mechanism.

10. The display panel mounting system of claim 8, wherein the mating mechanism comprises a plurality of pairs of prongs for receiving respective pins of the mounting base and latches for securing the pins between the respective pairs of prongs.

11. The display panel mounting system of claim 8, wherein the mating mechanism is integrated into a tray.

12. The display panel mounting system of claim 8, wherein the mounting base comprises:
   a tray having a generally rectangular shape; and
   a plurality of sidewalls forming a top wall, a bottom wall, a left wall and a right wall defining an enclosure having an open front, wherein at least one of the sidewalls comprising the pin, wherein the pin extends outward and perpendicular to the sidewall.

13. The display panel mounting system of claim 8, wherein the mounting base comprises:
   a tray having a generally rectangular shape; and
   a plurality of sidewalls forming a top wall, a bottom wall, a left wall and a right wall defining an enclosure having an open front, wherein at least one of the sidewalls comprising the pin, wherein the pin extends inward and perpendicular to the sidewall.

\* \* \* \* \*